(12) United States Patent
Ishikawa

(10) Patent No.: US 6,651,310 B1
(45) Date of Patent: Nov. 25, 2003

(54) METHOD OF MANUFACTURING ALUMINUM ROTOR AND MOTOR INCORPORATING THE SAME

(75) Inventor: Masayuki Ishikawa, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/511,270

(22) Filed: Feb. 23, 2000

(30) Foreign Application Priority Data

Feb. 23, 1999 (JP) ............................................. 11-044100

(51) Int. Cl.[7] ............................................. H02K 15/10
(52) U.S. Cl. ............................. 29/598; 29/596; 29/732; 310/67 R; 310/156; 310/267
(58) Field of Search ........................ 29/598, 596, 732; 310/67 R, 156, 267; 360/98.7; 384/129, 121

(56) References Cited

U.S. PATENT DOCUMENTS

| | | | | |
|---|---|---|---|---|
| 3,990,141 A | * | 11/1976 | Stark ............................ | 29/596 |
| 4,922,604 A | * | 5/1990 | Marshall et al. ............... | 29/598 |
| 5,494,713 A | * | 2/1996 | Ootuki ........................ | 427/579 |
| 5,635,465 A | * | 6/1997 | Sobata et al. ................ | 510/274 |
| 6,023,839 A | * | 2/2000 | Kinoshita et al. ............. | 29/598 |
| 6,304,009 B1 | * | 10/2001 | Lawrence .................... | 310/42 |

FOREIGN PATENT DOCUMENTS

| | | | |
|---|---|---|---|
| DE | 3528946 | * | 8/1985 |
| JP | 4-286723 | * | 10/1992 |
| JP | 8-106712 | * | 4/1996 |

OTHER PUBLICATIONS

PCT, WO 96/254476 to Karube et al, Aug. 22, 1996.*

* cited by examiner

Primary Examiner—Carl J. Arbes
Assistant Examiner—Minh Trinh
(74) Attorney, Agent, or Firm—Sughrue Mion, PLLC

(57) ABSTRACT

A method of manufacturing an aluminum rotor and motor incorporating the rotor where after a solvent cleaning step of a rotator body using a chlorine-family solvent, an alkaline degreasing step using an alkaline degreasing agent is executed for cleaning the rotator body, and the rotator body after undergoing the solvent cleaning step is simply immersed in a treatment tank storing an alkaline degreasing agent, whereby the chlorine-family solvent remaining on the rotator body or aluminum chloride produced by the chlorine-family solvent reacting with aluminum material reacts with the alkaline degreasing agent and is removed easily and well.

12 Claims, 3 Drawing Sheets

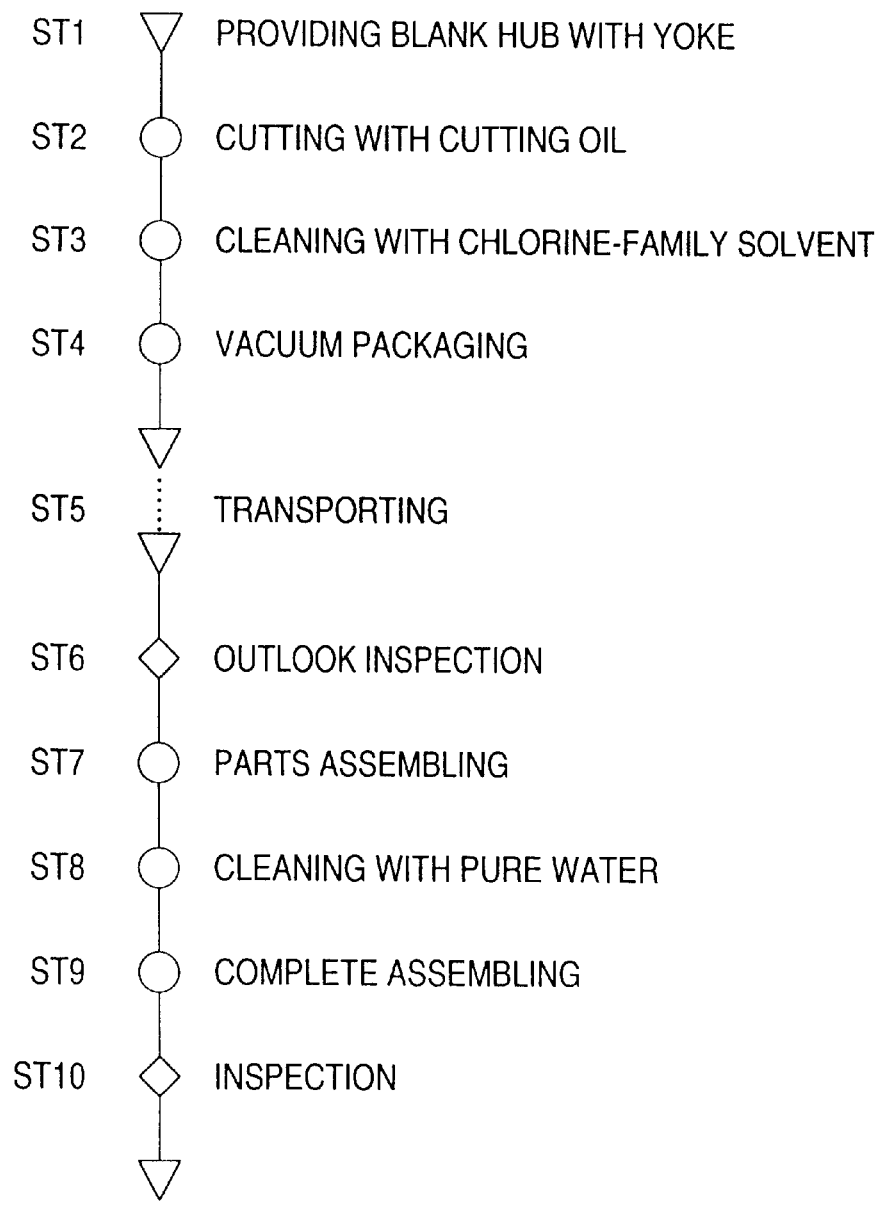

METHOD OF MANUFACTURING ALUMINUM ROTOR AND MOTOR INCORPORATING THE SAME

BACKGROUND OF THE INVENTION

This invention relates to a method of manufacturing a rotator body made of aluminum used as a rotor of a motor by cutting operation, and a method of manufacturing a motor incorporating the rotor.

Hitherto, rotator bodies made of aluminum have been widely adopted as rotors of motors used with hard disk drives (HDDs) and polygon mirror drives. For example, a rotation hub 1 made of aluminum, a rotor, used with a motor for a hard disk drive shown in FIG. 2 comprises a bearing (not shown) attached to an inner peripheral face 1a of the rotation hub 1 for forming a rotor drive section of the motor. A recording medium disk of a rotated body (not shown) is placed on an outer peripheral face 1c of the rotation hub 1.

To manufacture a rotor made of aluminum for a motor typified by the rotation hub 1, first a blank provided integrally with a yoke is manufactured by aluminum die casting, etc., (step ST1) and is cut to predetermined dimensions for forming a rotator body made of aluminum used as a motor rotor (step ST2), for example, as shown in FIG. 3. Cutting oil is used for the cutting; the remaining cutting oil on the rotator body after the cutting step is removed at the following cleaning step ST3.

To remove the cutting oil at the cleaning step, a solvent is used because it is hard to remove the oil component in pure water. Generally, for example, a chlorine-family solvent of trichloroethylene, methylene chloride. tetrachloroethylene, etc., is adopted as the solvent. Since the chlorine-family solvent is dried extremely rapidly, treatment can be executed at low costs by a simple unit.

To built the rotation hub thus cleaned in the solvent in a motor, the rotation hub is transported to the following parts assembling step. The parts assembling step is not necessarily executed at the same location or area as the rotator body cutting step, and is often executed in a different area. The rotation hub after cleaned in the solvent is often transported to a different area, for example, a remote site and thus is packed in vacuum at step ST4 to prevent corrosion, etc., and is transported at step ST5. In the parts assembling step after the rotation hub is transported, first a visual inspection is executed at step ST6, then the rotation hub is built in a motor, namely, parts assembling is performed at step ST7. That is, as shown in FIG. 2, an annular magnet 3 is attached via a back yoke 2 to the inner peripheral face of an annular yoke part 1b integrated in the opening margin on the bottom of the rotation hub 1 in FIG. 2. In the state, again as shown in FIG. 3, the rotation hub 1 is cleaned in pure water with a neutral detergent at step ST8, then is built in a stator of the motor as finish assembling of a finished product at step ST9. Last, an inspection is executed at step ST10.

However, in the manufacturing method of the rotator body made of aluminum in the related art, it is difficult to completely clean and remove the chlorine-family solvent used for cleaning the cutting oil in the solvent described above, thus the remaining chlorine-family solvent reacts with the aluminum material to cause corrosion and produce aluminum chloride ($AICl_3$) as a white spot-like corrosion portion on the aluminum surface at the assembling time or at the actual use time. The corrosion portion of aluminum chloride ($AICl_3$) has a possibility that it will peel off the surface of the rotor and fly. For example, if the rotor made of aluminum is used with a hard disk drive motor, the corrosion portion may peel off the surface of the rotor and lead to the surface of a recording medium disk, causing a problem of head crash, etc., to occur.

From such a problem, it is also possible to use a hydrocarbon-family solvent without using a chlorine-family solvent to clean cutting oil in a solvent. In this case, however, the solvent drying speed becomes extremely low, thus the solvent drying step involves large facilities; it is hard to adopt a hydrocarbon-family solvent from the viewpoint of the manufacturing costs.

SUMMARY OF THE INVENTION

It is therefore an object of the invention to provide a manufacturing method of a rotator body made of aluminum wherein cutting oil can be well removed from the rotator body in a short time and a manufacturing method of a motor incorporating the rotor.

In order to achieve the above object, after a solvent cleaning step of a rotator body using a chlorine-family solvent, an alkaline degreasing step using an alkaline degreasing agent is executed for cleaning the rotator body, and the rotator body after undergoing the solvent cleaning step is simply immersed in a treatment tank storing alkaline degreasing agent, whereby the chlorine-family solvent remaining on the rotator body or aluminum chloride produced by the chlorine-family solvent reacting with aluminum material reacts with the alkaline degreasing agent is removed easily and well.

BRIEF DESCRIPTION OF THE DRAWINGS

In the accompanying drawings:

FIG. 3 is a flowchart to show a manufacturing method of a rotator body in a related art.

DETAILED DESCRIPTION OF THE PREFERRED EMBODIMENTS

Referring now to the accompanying drawings, there is shown a preferred embodiment of a rotor made of aluminum in the invention as a yoke-integral type rotation hub 1 (see FIG. 2) built in a hard disk drive (HDD).

Figure 1:
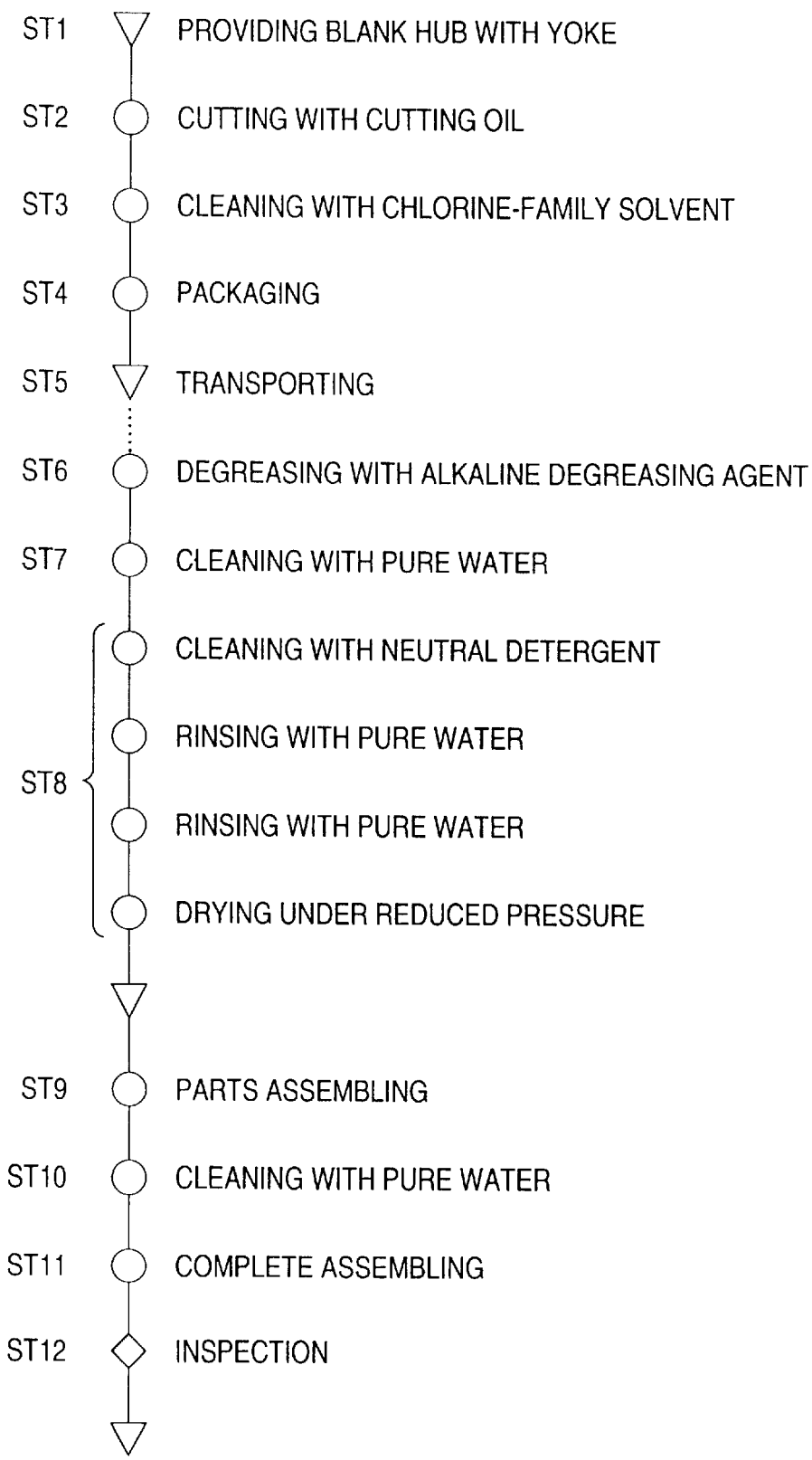
FIG. 1 is a flowchart to show a manufacturing method of a rotator body according to one embodiment of the invention.

As shown in FIG. 1, first a material of a rotator body made of an aluminum material as a motor rotor is provided. The material of a rotator body made of an aluminum material is a blank for yoke-integral type rotation hub 1 comprising a yoke in one piece and is manufactured by aluminum die casting, etc., (step ST1). The yoke-integral type rotation hub 1 is the rotor in FIG. 2 before a rotor magnet 3 is attached, and is a blank integral only with a yoke 2 for holding the rotor magnet 3 by calking, forging, etc. The blank is cut while cutting oil is used at step ST2 to predetermined dimensions. As the cutting operation is performed, necessary portions such as an outer peripheral surface of the rotation hub 1 of a rotor, a disk mount face on which a disk of a rotated body is mounted, and an inner peripheral surface and a bearing mount face of the rotation hub 1 are formed. The cutting oil used at the cutting step is hard to eliminate in pure water and thus is removed using a solvent at the following solvent cleaning step ST3. At the time, for example, a chlorine-family solvent of trichloroethylene, methylene chloride, tetrachloroethylene, etc., is adopted as the solvent. Since such a chlorine-family solvent is dried extremely rapidly, it is made possible to execute treatment at low costs in a short time using a simple unit.

If the next step is executed at a remote location, the rotation hub thus provided through the cutting step and the solvent cleaning step is packed at step ST4 and is transported to a parts assembling department, etc., at a remote location at step ST5. At the transport time, vacuum packing formerly required is not required because the solvent will be removed at a later step. At step ST4, the rotation hub is packed to transport the rotation hub to the parts assembling department, etc., at a remote location, but need not be packed if the rotation hub is to be in stock.

On the other hand, in the parts assembling department, an alkaline degreasing treatment step ST6 is executed for the rotation hub before the rotation hub undergoes a parts assembling step. The alkaline degreasing treatment step is executed for removing the remaining chlorine-family solvent on the rotation hub or aluminum chloride of a white spot-like corrosion portion; it is executed by immersing a tray storing a plurality of rotation hubs in the following first to fourth tanks in order.

First, the first tank is a pure water warming tank, in which pure water warmed to about 50° C. is stored. The second tank is an alkaline water degreasing tank, in which a proper alkaline water solution, for example, a 10%–20% solution of sodium orthosilicate ($Na_4SiO_4$), a 20%–25% solution of sodium carbonate ($Na_2CO_3$), or a 4%–8% solution of sodium hydroxide (NaOH) is stored. The alkaline degreasing water solutions are warmed to 60° C., 60° C., and 40° C. for use and the alkaline degreasing treatment times (immersion times) under the temperature conditions are set to 1–6 minutes, 2–8 minutes, and 20–45 seconds, whereby the necessary and sufficient alkaline degreasing effect of the chlorine-family solvent is provided.

The alkaline degreasing water solution is used as described above, whereby the ground of the rotator body made of aluminum material is dissolved and aluminum chloride of a corrosion portion together with the oil component remaining on the surface of the aluminum material is removed, whereby aluminum chloride of the corrosion portion together with the oil and fat components deposited on the rotation hub can be removed. Since the aluminum material is amphiprotic metal, the ground can be dissolved if an acid is used. However, an acid is not preferred because the oil and fat components deposited on the rotation hub cannot be removed if an acid is used.

The third and fourth tanks are rinse tanks and the alkaline degreasing agent is rinsed out of the rotation hub with pure water stored in the tanks.

Thus, in the embodiment, the rotation hub after it is cleaned in the solvent is simply immersed in each tank storing the alkaline degreasing agent, etc., in order, whereby the chlorine-family solvent remaining on the rotation hub or aluminum chloride ($AlCl_3$) produced by the chlorine-family solvent reacting with the aluminum material reacts with the alkaline degreasing agent and is removed easily and well.

In this case, if an acid degreasing agent is used in place of the alkaline degreasing agent, the units including the tanks must be made resistant to acids and the whole facilities become extremely large-scaled.

At the time, if an alkaline degreasing agent described above which can be obtained at low costs is used, a lower-cost unit can be attained.

Further, if the alkaline degreasing agent is warmed as in the embodiment, the reaction is speeded up, so that the degreasing treatment time is shortened.

After the alkaline degreasing treatment step is thus executed, rough cleaning with pure water is executed at step ST7 and finish cleaning is executed at step ST8. In the finish cleaning, first a neutral detergent is used for cleaning. The neutral detergent is used, for example, at a concentration of 0.2%–4%. Next, rinsing with pure water is repeated twice, whereby the alkaline degreasing agent is completely removed, then drying is performed under a reduced pressure. This reduced pressure drying step is executed by making the rotation hub pass through a dry tank using hot air and a dry tank heated to a high temperature.

Figure 2:
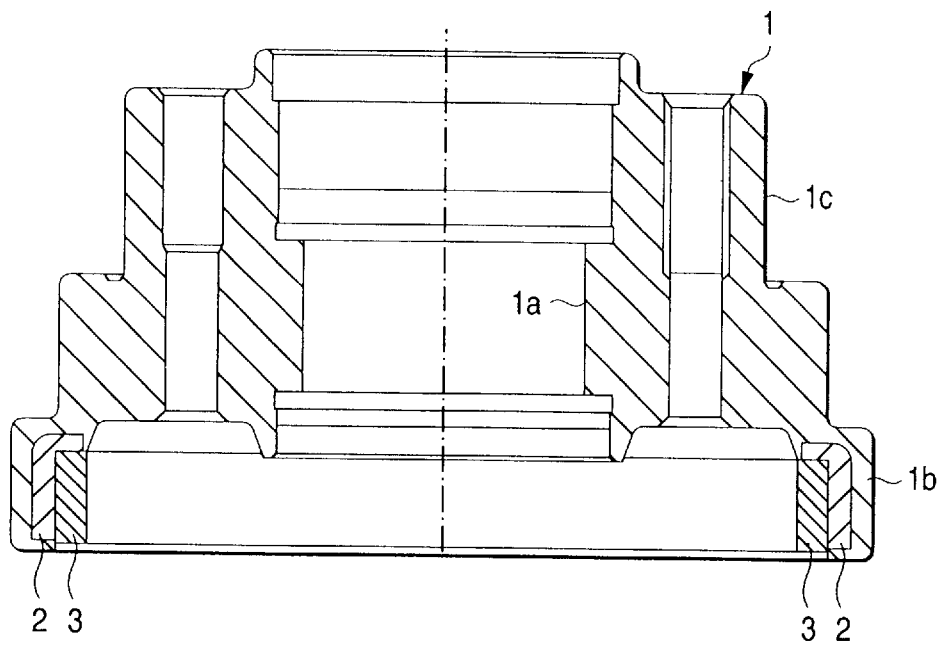
FIG. 2 is a transverse sectional view to show the structure of a rotation hub used with a hard disk drive as an example of the rotor incorporating the invention.

The rotation hub undergoing each treatment is transported to the following parts assembling step ST9. At the parts assembling step, the rotation hub is built so as to become a complete motor rotor; for example, an annular drive magnet 3 as shown in FIG. 2 is attached to the rotation hub 1 via a back yoke 2.

Referring again to FIG. 1, a pure water cleaning step using a neutral detergent and pure water (step ST10) is applied to the rotation hub 1 after the assembly described above, then the rotation hub is built in a stator of a motor to assemble a complete product of a motor at step ST1 1. Last, an inspection is executed at step ST12.

To check the effect produced by changing the steps from those in the related art, the amount of the chlorine-family solvent remaining on the rotation hub 1 or aluminum chloride produced by the chlorine-family solvent reacting with the aluminum material was actually measured at the inspection step. The former defective occurrence rate was 40%–60%, but the defective occurrence rate as a result of applying the invention became almost 0% and the problem in the related art can be solved.

Although the invention has been described in its preferred embodiment with a certain degree of particularity, it is understood that the invention is not limited to the specific embodiment thereof and widely different embodiments of the invention may be made without departing from the spirit and scope thereof.

For example, the invention is not limited to a rotation hub for a hard disk drive motor as in the embodiment described above and can also be applied to rotator bodies made of aluminum used with various rotation drives such as a polygon mirror drive motor requiring a similar clean degree.

As described throughout the specification, in the invention, after the solvent cleaning step of the rotator body using the chlorine-family solvent, the alkaline degreasing step using the alkaline degreasing agent is executed for cleaning the rotator body, and the rotator body after undergoing the solvent cleaning step is simply immersed in the treatment tank storing the alkaline degreasing agent, whereby the chlorine-family solvent remaining on the rotator body or aluminum chloride produced by the chlorine-family solvent reacting with the aluminum material reacts with the alkaline degreasing agent and is removed easily and well. Thus, in a simple and inexpensive configuration, cutting oil can be well removed from the rotator body made of aluminum in a short time and the surface of the rotator body made of aluminum can be purified.

After the alkaline degreasing step, the pure water cleaning step of cleaning the rotator body with pure water is executed, whereby the alkaline degreasing agent is removed, and it is made possible to improve the quality all the more.

What is claimed is:

1. A method of manufacturing a rotator body made of an aluminum material used as a rotor of a motor, comprising the steps of:

cutting a blank made of the aluminum material to form the rotator body into a predetermined shape while applying cutting oil;

cleaning the cut rotator body with a chlorine-family solvent to remove the cutting oil remaining thereon; and degreasing the cleaned rotator body with an alkaline degreasing agent, after the cleaning step, to dissolve a ground of the aluminum material to remove an oil component and aluminum chloride remaining on a surface of the aluminum material of the cut rotator body.

2. The manufacturing method as set forth in claim 1, further comprising the step of cleaning the degreased rotator body with pure water after the degreasing step.

3. The manufacturing method as set forth in claim 1, wherein the blank of the rotator body is a rotation hub integrally provided with a yoke on which a rotor magnet is to be attached, and wherein the rotation hub is used for either a hard disk drive motor or a polygon mirror drive motor.

4. The manufacturing method as set forth in claim 1, wherein the alkaline degreasing agent is warmed before finishing the degreasing step.

5. The manufacturing method as set forth in claim 1, further comprising the step of transporting the rotator body to a remote place, which is executed between the cleaning step and the degreasing step.

6. The manufacturing method as set forth in claim 1, wherein the alkaline degreasing agent is selected from the group consisting of sodium orthosilicate, sodium carbonate, and sodium hydroxide.

7. A method of manufacturing a motor comprising the steps of:

providing a blank made of aluminum for a rotator body which is to be a rotor of the motor;

cutting the blank to form the rotator body into a predetermined shape while applying cutting oil;

cleaning the cut rotator body with a chlorine-family solvent to remove the cutting oil remaining thereon;

degreasing the cleaned rotator body with an alkaline degreasing agent, after the cleaning step with the chlorine-family solvent, to dissolve a ground of the aluminum material to remove an oil component and aluminum chloride remaining on a surface of the aluminum material of the cut rotator body;

cleaning the degreased rotator body with pure water; and assembling the motor so as to incorporate the cleaned rotator body as the rotor.

8. The manufacturing method as set forth in claim 7, wherein the blank is provided integrally with a yoke on which a rotor magnet is to be attached in the assembling step.

9. The manufacturing method as set forth in claim 7, wherein the alkaline degreasing agent is selected from the group consisting of sodium orthosilicate, sodium carbonate, and sodium hydroxide.

10. The manufacturing method as set forth in claim 7, wherein the cleaned rotator body is a rotation hub integrally provided with a yoke used for either a hard disk drive or a polygon mirror drive.

11. The manufacturing method as set forth in claim 7, wherein the predetermined shape includes an outer periphery of the rotator body and a surface on which a rotated body is mounted.

12. The manufacturing method as set forth in claim 7, further comprising the step of transporting the rotator body to a remote place, which is executed between the cleaning step and the degreasing step.

* * * * *